United States Patent Office 3,555,009
Patented Jan. 12, 1971

3,555,009
PROCESS FOR THE PRODUCTION OF STARCH DERIVATIVES
Shigeo Suzuki, Tokyo, Keiji Kainuma, Urawa-shi, and Koehi Tanida and Tsuneo Oda, Tokyo, Japan, assignors to Food Research Institute, Ministry of Agriculture and Forestry, Japanese Government
Filed Mar. 28, 1967, Ser. No. 626,523
Claims priority, application Japan, Jan. 16, 1967, 42/2,679
Int. Cl. C08b 9/04
U.S. Cl. 260—233.5                                   6 Claims

ABSTRACT OF THE DISCLOSURE

This invention relates to improvements in the synthesis of starch derivatives. The process in accordance with this invention is characterized in that an alkaline aqueous starch suspension is reacted with phosphoric anhydride, yielding inhibited-swelling cross-linking type starch phosphates. The primary product is esterified, neutralized and allowed to stand until orthophosphate is sufficiently formed, yielding acid resistant, electrolyte resisting, and low temperature stable derivatives, which have been heretofore produced by employing two kinds of phosphoric acids. These products are useful in the edible condiment industry and as pastes in the textile industry and other industries.

BACKGROUND OF THE INVENTION

(1) Field of the invention

This invention relates to a process for the production of starch. One is the diester derivative combined in the and relates to the agricultural chemistry. In view of the uses of the products of the process, this invention relates to the food industry, textile industry, and adhesive industry.

(2) Description of the prior art

There are two kinds of the phosphoric acid derivatives of starch. One is the diester derivative combined in the cross-linking type. The other is the monoester derivative in which a phosphoric radical is combined with three groups of the $C_6$, $C_2$, and $C_3$ positions in the glucose residue of starch as monoesters. Processes for the production of the diester derivative were proposed by R. Lohmar and J. W. Sloan (J. Am. Chem. Soc., vol. 72, p. 717, 1950) and G. E. Felton and H. H. Schopmeyer (U.S. Pat. 2,328,537 of 1943), employing phosphorus oxychloride. British Pat. 770,565 of 1957 disclosed a process in which sodium trimetaphosphate is employed. Processes for the production of the monoester derivative were proposed by H. Neukom (U.S. Pat. 2,884,412) in which disodium orthophosphate, monosodium orthophosphate, etc. are employed.

It is our intention to control the properties of various starch derivatives to correspond to their ultimate use. Therefore we have searched for substitutes for the above phosphate cross-linking agents within the range of the phosphoric acids and salts thereof. In our search we have looked for cross-linking agents which are more reactive and carry out the phosphoric acid cross-linking through a relatively simple reaction process. Thus orthophosphoric acid, sodium orthophosphate, potassium orthophosphate, ammonium orthophosphate, sodium tripolyphosphate, sodium metaphosphate, sodium hexametaphosphate, phosphoric anhydride, etc. have been studied by us.

For adjusting the formation of cross-linking combination of starch, there are such means as observing variations in the swelling and the solubility and measuring the photopastegraphy and the amylography. The photopastegraphy is measured by the variation in the transparency of aqueous starch suspension while being heated at a constant speed. The amylography is similary automatically measured by the variation in the viscosity thereof while being heated at a constant speed. In the photopastegraphy and the amylography, we employed such properties as illustrated in FIGS. 1 and 2 as indexes for judging the formation of a cross-linking combination.

It is possible to produce various products whose properties vary widely depending upon the degree of cross-linking, from the cross-linking type starch phosphates obtained as above. For example, such a ralatively lowly cross-linked material as having one bridge per 1000 to 2000 AGU (anhydrous glucose unit) is pertinent for making a high temperature stable, highly viscous paste. In such a more highly cross-linked material as having one bridge per hundrded AGU, the swelling is remarkably inhibited and the viscosity is, in the neutral state, rather low. But the latter material shows a high viscosity in the acidic region, from which a stable paste may be formed. FIG. 3 illustrates an amylogram of the material in the acidic region. Such a material as above is useful where viscosity stability in the acidic state is required, particularly as a thickener and a stabilizer for use in such edible condiments as sauce, ketchup, dressing, and the like.

The viscosity stability of starch is remarkably improved by synthesizing cross-linked type starch derivatives as above to provide for starch derivatives having acid resistant, electrolyte resistant and age resistant properties at low temperature. In accordance with the prior art, in order to give the acid proof property and the electrolyte resistance, starch is diesterified while, in order to be endowed with the low temperature stability, the same is monoesterified. In addition, in case where a derivative, in which the two requirements are to be equally satisfied, is to be produced, orthophosphoric acid is added to a primary product once yielded by completing the esterification reaction. Thus the two reactions are combined one after another in accordance with the prior art. In such a process as above, there are such drawbacks that more addition and more kinds of phosphates are required and, at the same time, the reacting operations become appreciably complicated.

SUMMARY OF THE INVENTION

Briefly stated in accordance with one aspect of this invention, there is provided, in the synthesis of inhibited-swelling cross-linking type starch phosphate by using phosphoric anhydride, a process comprising steps of suspending starch in water, adjusting the pH value of the aqueous starch suspension to an alkaline state by adding thereto an alkali metal hydroxide or an alkaline earth metal hydroxide, hydrating phosphoric anhydride in the aqueous starch suspension so as to form several kinds of phosphoric acids of different degree of hydration with which the starch is reacted at a temperature of lower than the gelatinization temperature of the starch and at a pH value of upper than 8.0, and recovering an inhibited-swelling cross-linking type starch phosphate from the suspension. An alkali carbonate may be added into the suspension as the buffering agent for keeping the suspension in the alkaline state for a long time. Further in accordance with this invention, the reacted alkaline suspension is neutralized by adding thereto an acid and is allowed to stand until a sufficient quantity of orthophosphate is formed, then the aqueous phase is filtered to obtain a cake which has absorbed thereon a sufficient amount of phosphate. The cake is dried and heated up to a temperature of from 110 to 170° C. for proceeding esterification, whereby a starch derivative is produced.

In our search for a single phosphoric acid or a single salt thereof that may form mono- and diesters in excellent yields, as referred to hereinbefore, we have found that phosphoric anhydride and a fresh aqueous solution thereof have remarkable cross-linking effect. The study will now more detailedly be described.

Phosphoric anhydride was dissolved in water and allowed to stand for a period, during which a sample was taken every hour and subject to chromatography. The variation in quantity of the phosphoric anhydride with respect to time elapsed was measured and the variation in quantities of such various phosphoric acids as metaphosphoric acid, pyrophosphoric acid, orthophosphoric acid, etc. formed therein also were correspondingly measured. As a result of this study, it has been found that the formation of such various phosphoric acids as above may be apperciably freely controlled by means of varying the time of standing from the time that the hydration of the phosphoric anhydride begins. It has been, however, also found that, in any case, such polymers as metaphosphoric acid, pyrophosphoric acid, etc. are formed at an early stage while the quantity of orthophosphoric acid becomes larger and larger in accordance with extension of the period of standing.

When phosphoric acids such as metaphosphoric acid, pyrophosphoric acid, tripolyphosphoric acid, etc. are reacted with starch they produce the diester combination, while a phosphoric acid orthophosphoric acid produces the the monoester combination without forming diester combination.

In accordance with this invention, utilizing such a phenomenon that phosphoric anhydride is actively transformed in an aqueous solution as above, it is employed as a diesterifying agent at the early stage of the hydration. After the diesterification has been ended, the liquid reactant is neutrailized by such an acid as phosphoric acid, hydrochloric acid, sulfuric acid, etc. The neutralized reactant is allowed to stand until orthophosphoric acid has been formed. The orthophosphoric acid absorbed by starch is then separated from other liquor by filtration as a cake which is then dehydrated and dried. After dried, phosphate adsorbed in the cake is dehydrated and esterified.

In accordance with this invention, the phosphoric acid to be used is derived from phosphoric anhydride. It is possible to use the phosphoric anhydride as the monoesterifying agent and the diesterifying agent for starch in accordance with the active transformation of the phosphoric anhydride in a solution.

In the process in accordance with this invention, starch as the starting material includes such aboveground starches as from corn, wheat, etc. and such underground starches as from sweet potato, potato, cassava, etc. The pretreated oxidized starch, acid treated starch, and other chemically processed starches are also included in the starting material. It is also possible to carry out the process in accordance with this invention to such highly starch containing powder as potato powder, sweep potato powder, flour, corn-flour, etc., so as to yield acid proof, electrolyte resisting, and low temperature stable paste material for the foodstuff and industries.

Further in accordance with this invention, the cross-linking type starch phoshate yielded by reacting phosphoric anhydride with aqueous starch suspension at a temperature lower than the gelatinization temperature of the starch is neutralized down to a pH value of from 4 to 7.5 by adding such an acid as hydrochloric acid, sulfuric acid, phosphoric acid, or the like and then allowed to stand until the mixture of various phosphoric acids is transformed into orthophosphoric acid. This period is carried out from several hours to a day. After the period the liquid reactant is filtered, obtaining a cake. After dehydration, the cake has absorbed thereon from 1 to 1.5 percent by weight of phosphoric acid on the dry basis of starch. The cake is dried to 20 percent or less of water content by means of a draft drier or other conventional drier. The dried cake is then heated up to a temperature of from 110 to 170° C. so as to carry out the dehydration and esterification reactions.

It is possible to control the properties of the products as above within an appreciable wide range depending upon the temperature and the duration of time that this temperature is maintained, the temperature being from 110 to 170° C. Thus with a lower temperature and shorter duration, the properties of the diesterified starch derivatives predominate so that the products are superior in the acid resistant properties and the electrolyte resistance and have the low temperature stability. When the heating temperature is elevated and the heating period is extended, the diester combination once formed is slowly thermally decomposed and, at the same time, a monoesterifying reaction is promoted between the phosphoric acid absorbed and starch. By virtue of these reactions, near monoester derivatives are produced, which gives transparent liquid paste having the acid proof property, electrolyte resistance, and excellent low temperature stability. By virtue of the control in the heating condition, it is possible to easily produce starch derivatives which have superior acid resistant properties and electrolyte resistance and, at the same time, are excellent in the low temperature stability.

The process in accordance with this invention is further characterized in that the phosphoric acid absorbed is more reactive compared with the prior art. When heating is continued for a matter of from five to eight hours, about only 20 percent of phosphoric acid absorbed participate in the esterifying combination in the process in accordance with the prior art, while, as we have found, about 45 to 55 percent of phosphoric acid is combined with starch in the process in accordance with this invention.

The starch derivatives obtained as above, which have superior acid resistant properties and electrolyte resistance as well as excellent resistance in the freeze-thawing tests, are excellent as the viscosity increasing agent and the moistening agent for sauce, mayonnaise, ice cream, etc. and also as the stabilizing agent for the canned foods and the refrigerated foods. Other than these uses in the field of the foodstuff industry, it is possible to use the starch derivatives as the moulding agent for the medicinal tablet, paste for the printing, separator for the dry cell, and sizing agent for the paper and textile.

DESCRIPTION OF THE PREFERRED EMBODIMENTS

Figure 1:
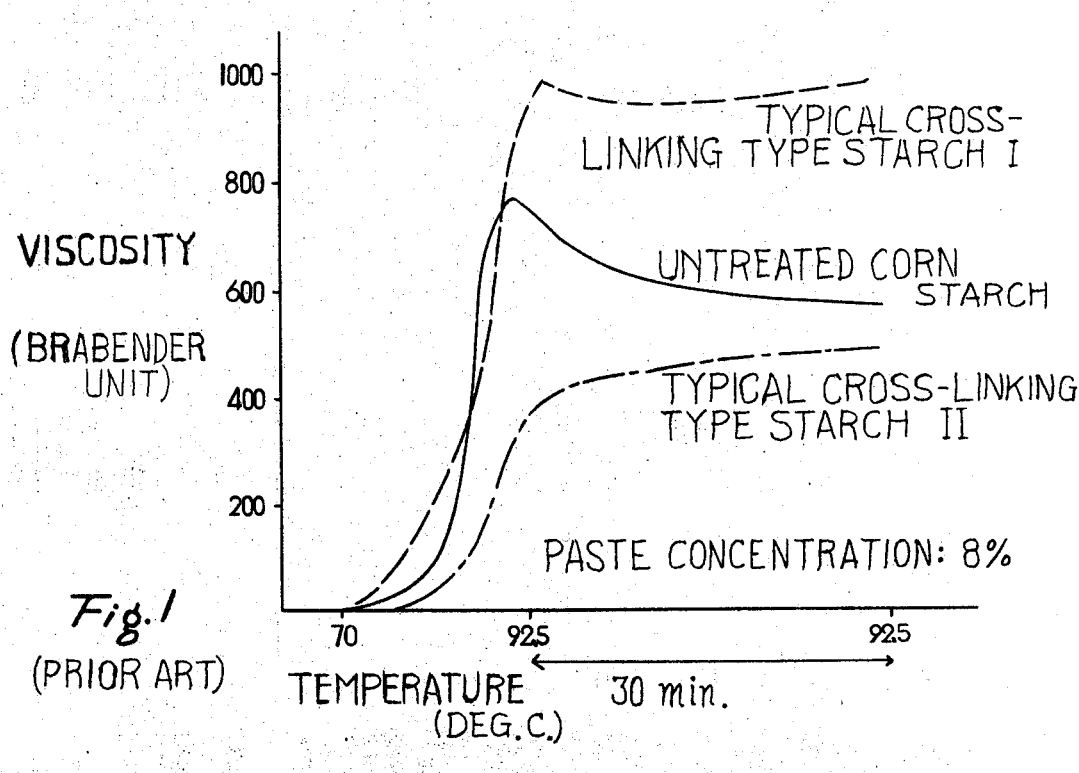
FIG. 1 is an amylogram of typical cross-linked starches compared with an untreated starch, the typical cross-linked starches being produced in accordance with the prior art and the characteristic curves thereof in the amylogram being used as indexes for judging the formation of a cross-linked combination.
Figure 2:
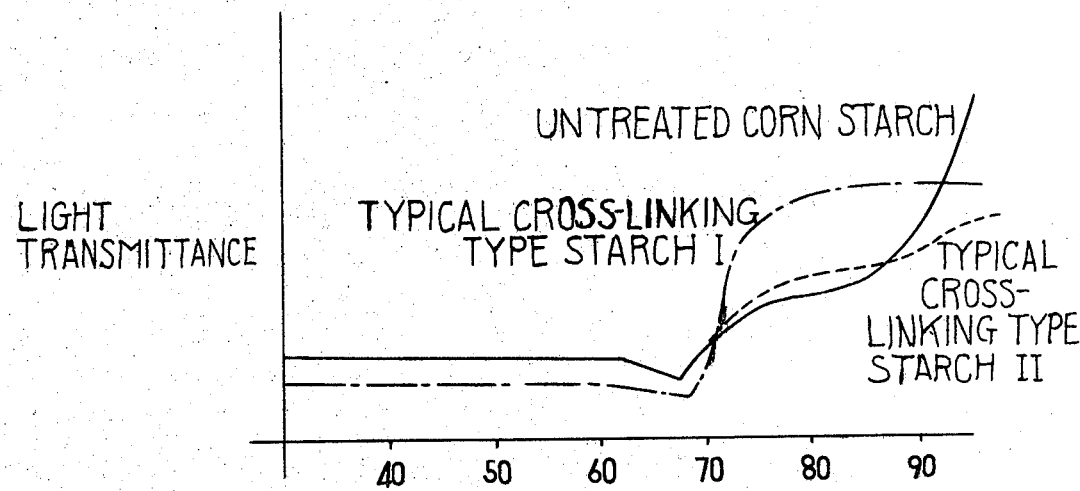
FIG. 2 is a photopastegram of typical cross-linked starches compared with an untreated starch, the typical cross-linked starches being produced in accordance with the prior art and the characteristic curves thereof in the photopastegram being used as indexes for judging the formation of a cross-linked combination.
Figure 3:
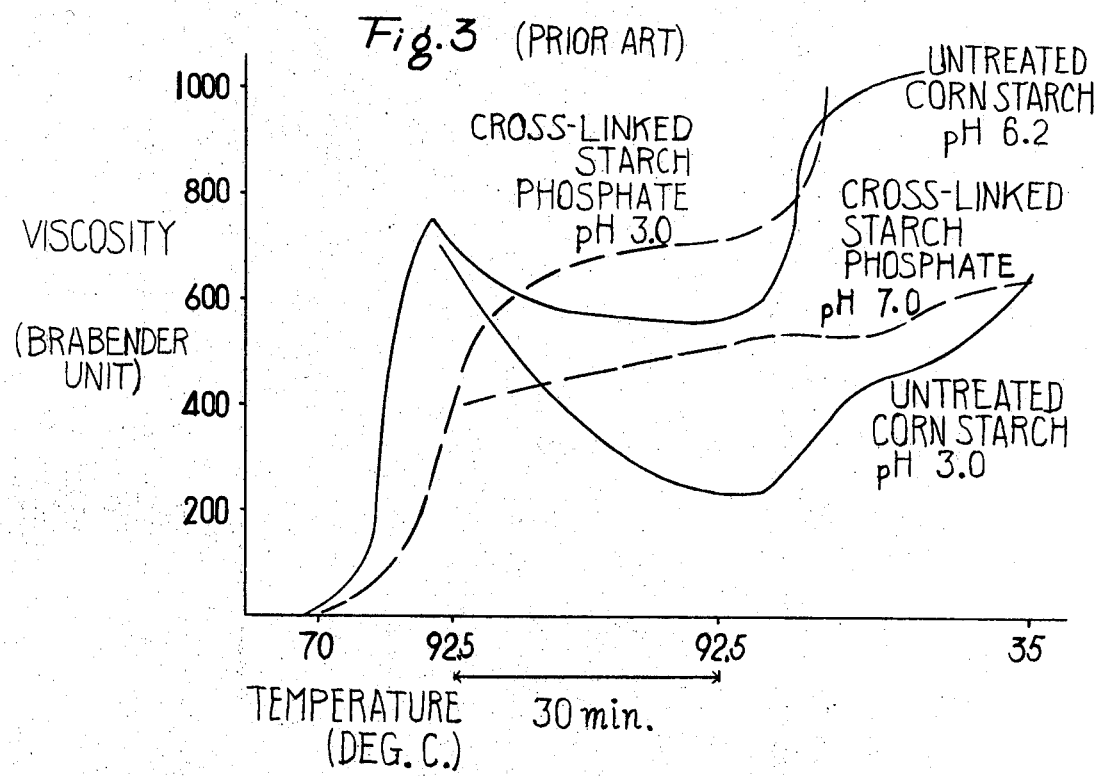
FIG. 3 is an amylogram of highly cross-linked starches compared with untreated starch in the acidic region, the highly cross-linked starches being produced in accordance with the prior art.
Figure 5:
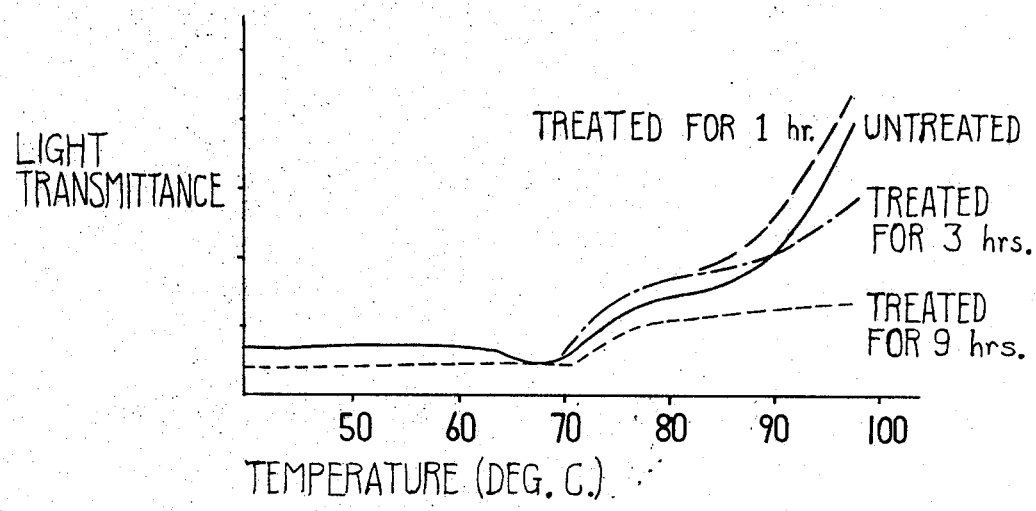
FIGS. 5 and 6 are a photopastegram and an amylogram in which the variation in the cross-linking degree is traced, respectively, in case of the Example 1.
Figure 4:
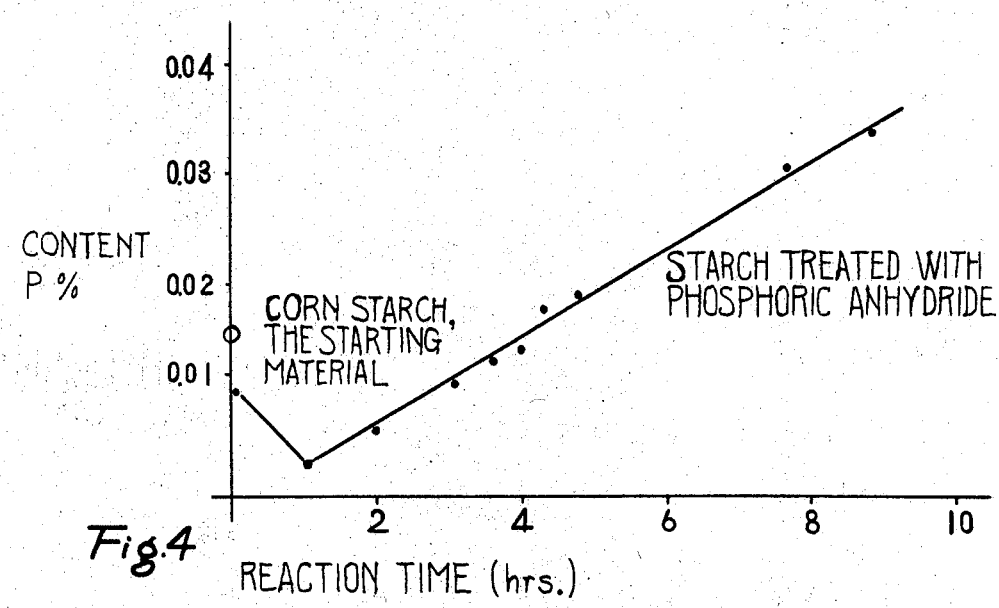
FIG. 4 illustrates the interrelation of the variation in reaction period to the variation in phosphoric acid content in case of the Example 1.
Figure 6:
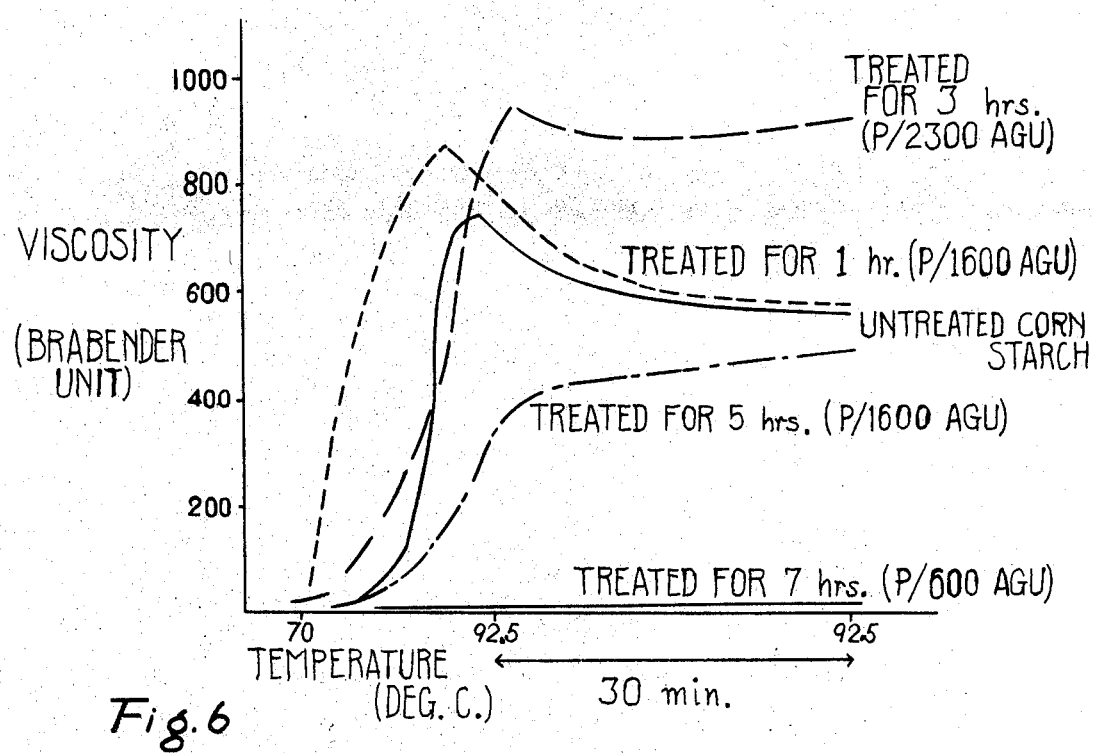
Figure 7:
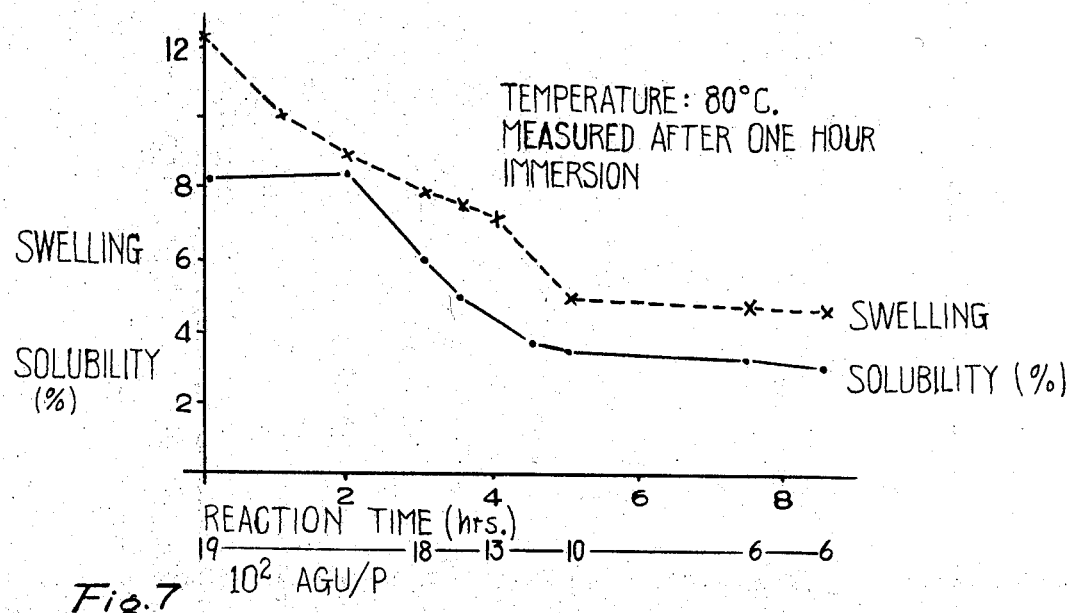
FIG. 7 is a graph of curves for the swelling and the solubility in which the variation in the cross-linking degree is traced in case of the Example 1.

The following embodiments illustrate methods of carrying this invention into effect.

Example 1

12 mols (dry weight 1,994 grams) of available corn starch were suspended in 2.4 liters of deionized water. 2.4 mols (254.5 grams) of sodium carbonate were added thereto. 1.2 mol (170.7 grams) of phosphoric anhydride was dissolved into 500 milliliters of water while being cooled with ice so as to yield a solution, which was then added to the suspension. After stirred for about 15 minutes, the suspension was adjusted to 11.0 in pH by an aqueous sodium hydroxide solution using a glass electrode pH meter. Water was added to the suspension so as to make the full volume up to 6 liters, in which a reaction was proceeded at a temperature of from 60 to 70° C. while stirring the reactant at a constant speed of 80 r.p.m. An aliquot volume was sampled every one hour. The resultant product was neutralized by hydrochloric acid so as to obtain a precipitate which was washed with deionized water. The washing was repeated to such a stage where no phosphoric and chlorine ions were not found in the supernatant liquid. The precipitate was then air-dried in a draft, yielding a cross-linking type starch phosphate.

The variation in content of phosphoric acid in this product and variations in photopastegram, amylogram, swelling curve, and solubility curve accompanied by the first-named variation are illustrated in FIGS. 4, 5, 6, and 7. As shown in these graphs, in accordance with the elevation in the capability of cross-linking, the swelling and solubility of starch become remarkably less and the viscosity curve becomes to represent a stability at the elevated temperatures.

Example 2

12 mols of corn starch (2,260 grams of the material containing 13.9 percent of water) were suspended in 1.2 mol of aqueous phosphoric acid solution prepared by dissolving 174 grams of phosphoric anhydride into water. The pH value of the suspension was adjusted to 11.0 by adding sodium hydroxide. The suspension was left to proceed reacting at a temperature of 60° C. for three hours, yielding a cross-linking type starch suspension containing a very small quantity of phosphorus but having a superior swelling inhibition and showing less breakdown in the amylogram. The cross-linking type starch suspension was adjusted in pH value by orthophosphoric acid. After standing over one night, the suspension was filtered, of which a cake obtained on the filter paper was air-dried in a draft at a temperature of from 50 to 60° C. When the water content thereof had become down to less than 20 percent, the cake was esterified by heating up to a temperature of 150° C.

The variations in water content and in phosphoric acid content obtained by means of sampling every two hours during the reaction period are illustrated in Table 1.

TABLE 1

|  | Reaction time for esterification, hours | | | | |
|---|---|---|---|---|---|
|  | 0 | 2 | 4 | 6 | 8 |
| Water content, percent | 12.4 | 2.4 | 0.6 | 0.4 | 0.2 |
| Combined phosphorus content, percent | 0.023 | 0.23 | 0.50 | 0.60 | 0.63 |
| Ratio of esterification of absorbed phosphorus, percent [1] |  | 16.1 | 35.0 | 42.3 | 43.8 |

[1] The ratio of esterification of absorbed phosphorus represents the ratio of phosphorus combined with starch by means of the esterifying reaction to that absorbed in the cake on the filter paper.

Example 3

12 mols of corn starch (2,260 grams of the material containing 13.9 percent of water) were suspended in 0.6 mol of aqueous phosphoric acid solution prepared by dissolving 8.7 grams of phosphoric anhydride into water. The pH value of the suspension was adjusted to 10.5 by adding sodium hydroxide. The suspension was left to react at a temperature lower than the gelatinization temperature of the starch for five hours. After the reaction has finished, the reactant was neutralized by adding hydrochloric acid so as to bring the pH value down to 6.50. After standing for ten hours, the reactant was filtered to obtain a cake which was dried. The dried cake was heated at a temperature of 125° C. for the esterification thereof. The variation in the phosphorus content is illustrated in Table 2.

TABLE 2

|  | Reaction time for esterification, hours | | | | |
|---|---|---|---|---|---|
|  | 0 | 2 | 4 | 6 | 8 |
| Water content, percent | 8.4 | 0.9 | 0.0 | 0.0 | 0.0 |
| Combined phosphorus content, percent | 0.020 | 0.17 | 0.35 | 0.42 | 0.44 |
| Ratio of esterification of absorbed phosphorus, percent [1] |  | 17.9 | 36.5 | 43.9 | 45.6 |

[1] The same with the representation in Table 1.

Example 4

Figure 8:
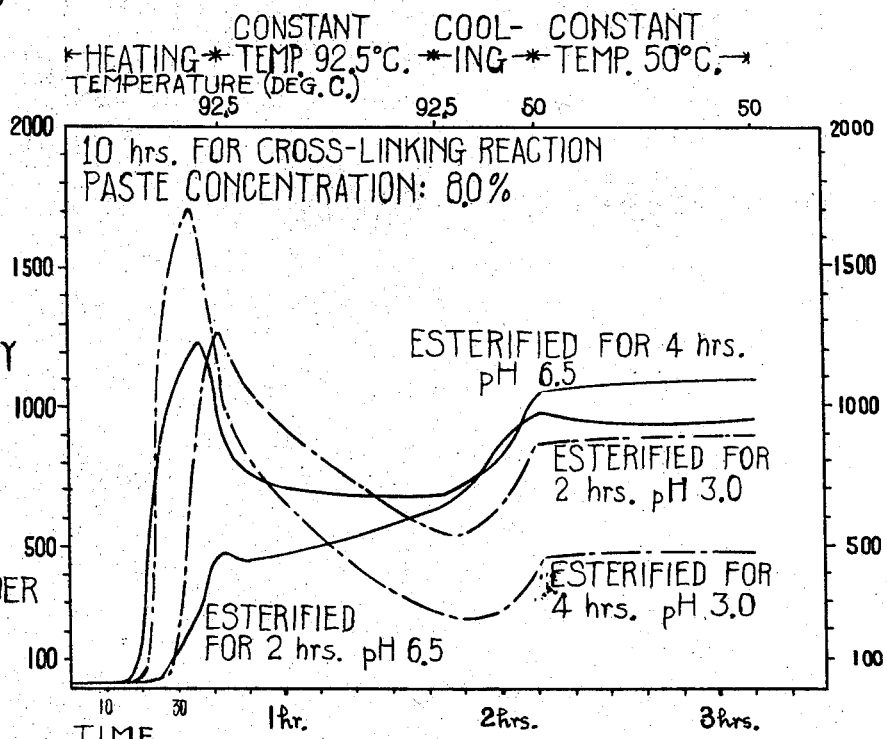
FIG. 8 is an amylogram of a starch derivative synthesized in Example 4, in which the variations in the viscosity in the neutralized region and in the acidic region of pH 3.0 are traced.
Figure 9:
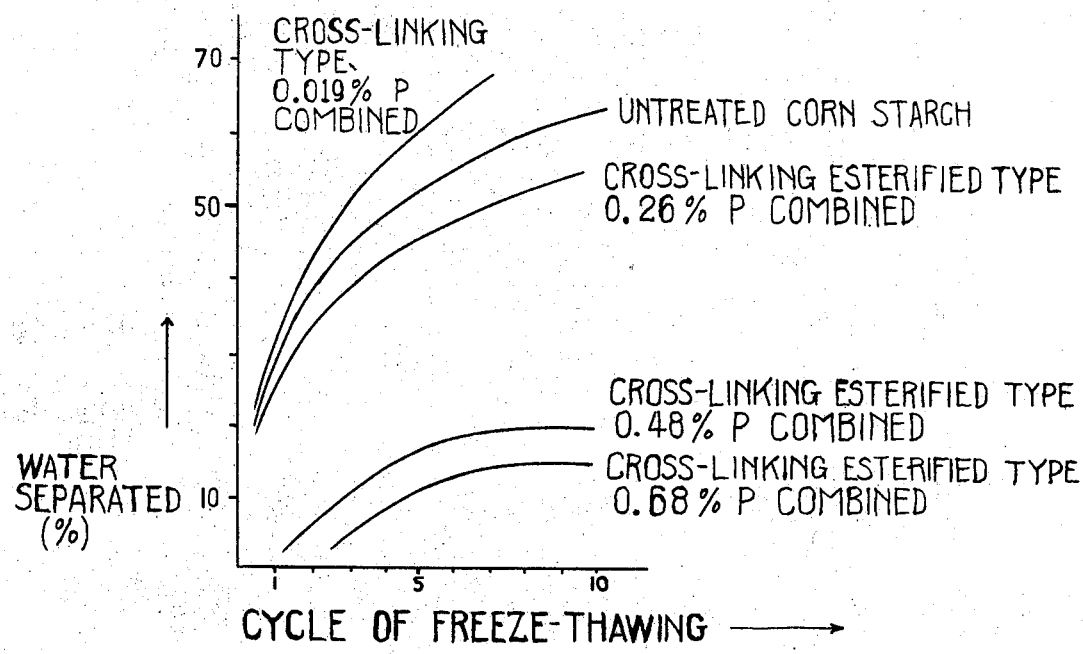
FIG. 9 is a graph of curves illustrating characteristics of various starch derivatives in a freeze-thawing test.

12 mols of corn starch (2,260 grams of the material containing 13.9 percent of water) were suspended in 3 liters of aqueous phosphoric acid solution containing 1.0 mol (142 grams) of phosphoric anhydride. The pH value of the suspension was adjusted to 11.0 by adding sodium hydroxide. The suspension was left to proceed reaction at a temperature of 60° C. for ten hours. Then the reactant was neutralized by adding hydrochloric acid thereto so as to bring the pH value down to 6.80. After standing for twenty hours, the reactant was filtered to obtain a cake which was dried. The dried cake was heated for esterification thereof, yielding a phosphoric derivative in which the monoesterifying combination was mixed with the diesterifying combination. The property of this derivative is illustrated in Table 3 and FIGS. 8 and 9.

TABLE 3

|  | Reaction time for esterification hours | | | | |
|---|---|---|---|---|---|
|  | 0 | 2 | 4 | 6 | 8 |
| Water content, percent | 7.8 | 1.2 | 0.7 | 0.3 | 0.2 |
| Combined phosphorus content, percent | 0.055 | 0.26 | 0.48 | 0.60 | 0.68 |
| Ratio of esterification of absorbed phosphorus percent [1] |  | 22.6 | 40.8 | 51.3 | 57.8 |

[1] The same with the representation in Table 1.

Example 5

Figure 10:
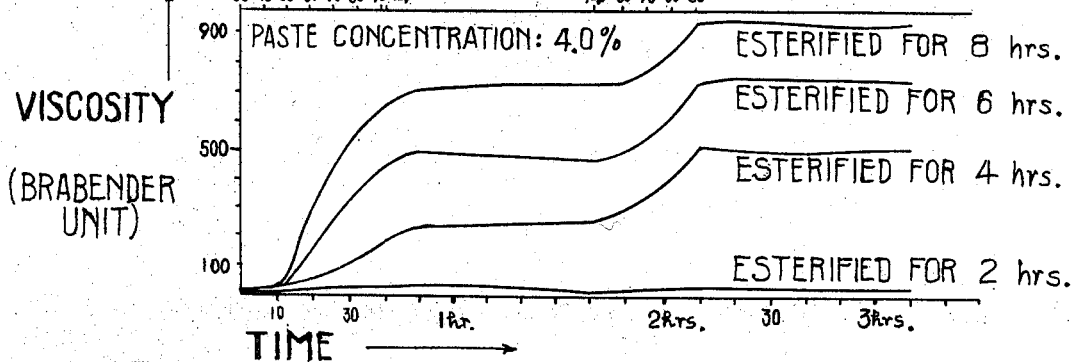
FIG. 10 is an amylogram of a starch derivative synthesized in Example 5.

12 mols of potato starch (2,371 grams of the material containing 18.0 percent of water) were suspended in an aqueous phosphoric acid solution prepared by dissolving 0.6 mol (85 grams) of phosphoric anhydride in water. The pH value of the suspension was adjusted 11.0 by adding sodium hydroxide. Diesterification was proceeded at a temperature of 50° C. for twenty-four hours with gently stirring in the aqueous suspension. Then the reactant was neutralized by adding sulfuric acid to bring the pH value down to 7.0. After standing for twenty hours, the reactant was filtered to obtain a cake, then dried. The dried cake was heated up to a temperature of 145° C. for esterification thereof. The esterified product was washed three times employing 50 percent methanol and dried. An aliquot volume was sampled every two hours. Variation in phosphoric acid content in these samples and an amylogram are illustrated in Table 4 and FIG. 10.

TABLE 4

| | Reaction time for esterification, hours | | | | |
|---|---|---|---|---|---|
| | 0 | 2 | 4 | 6 | 8 |
| Phosphoric acid content [1] | 0.076 | 0.33 | 0.51 | 0.60 | 0.64 |

[1] Percent on the dry basis of product.

Example 6

0.3 mol of phosphoric anhydride (42.6 grams) was dissolved in 5 liters of deionized water and stood still for twenty minutes, in which 10 mols of sweet potato starch (1,976 grams of the material containing 18 percent of water) were suspended. The pH value of the suspension was adjusted to 10.70 by adding potassium hydroxide thereto. The suspension was subjected to cross-linking reaction by stirring it at a speed of 80 r.p.m. for eight hours while maintaining it at a temperature of 55° C. The resulting reaction product was adjusted in pH value down to 6.50 by adding hydrochloric acid thereto, and stood still at the room temperature for fifteen hours so as to proceed the hydration of phosphoric acid and the absorption thereof into starch granules. Subsequently, the product was filtered under a reduced pressure, obtaining a cake, which was dried to a water content of 10 percent in a rotary hot air drier. Then the dried cake was dehydrated tion vessel provided with a stirrer of 40 r.p.m. Table 5 shows the variation in the phosphoric acid content which follows the progress of the reaction. The phosphoric acid content when the disesterification had been ended was 0.017 percent.

TABLE 5

| | Reaction time for monoesterification, hours | | | | |
|---|---|---|---|---|---|
| | 0 | 2 | 4 | 6 | 8 |
| Content of phosphoric acid [1] | 0.017 | 0.18 | 0.52 | 0.64 | 0.69 |

[1] Percent on the dry basis of product.

By this reaction the characteristics of sweet potato starch paste are improved remarkably. Namely, it is possible to obtain a paste of high viscosity, short in its character, high transparency and highly stable during cold-storage.

While particular embodiments of the invention have been illustrated and described, modifications thereof will readily occur to those skilled in the art. It should be understood therefore that the invention is not limited to the particular methods disclosed but that the appended claims are intended to cover all modifications which do not depart from the true spirit and scope of the invention.

What is claimed as new and desired to be secured by Letters Patent of the United States is:

1. A process for the production of a starch derivative comprising:
   (a) providing an aqueous starch suspension which has had its pH adjusted to at least 8 by the addition of a compound selected from the group consisting of an alkali metal hydroxide and an alkaline earth metal hydroxide;
   (b) adding phosphoric anhydride to said suspension to form acids;
   (c) reacting said starch suspension with said acids of phosphoric anhydride at a temperature lower than the gelatinization temperature of said starch; and at a pH of over 8 to form a starch diester phosphate linkage;
   (d) adjusting the pH of the reaction medium to a value of from 4 to 7.5 by the addition of an acid;
   (e) allowing the reaction medium to stand at pH from 4 to 7.5 to cause acids of the phosphoric anhydride to form the orthophosphoric acid;
   (f) filtering said starch containing orthophosphoric acid adsorbed thereon in the form of a filter cake from said aqueous medium;
   (g) heating said cake to a temperature of from 110° C. to 170° C. to esterify the starch and the orthophosphoric acid; and
   (h) recovering said starch containing monoester and diester linkage.

2. The process of claim 1 wherein said aqueous starch suspension is adjusted in part (a) to a pH of from 8 to 12.

3. A process for the production of inhibited swelling cross linking type of starch phosphate comprising providing an aqueous starch suspension which has been adjusted to a pH of at least 8 by the addition of a compound selected from the group consisting of an alkali metal hydroxide and an alkaline earth metal hydroxide, adding to said suspension phosphoric anhydride to form acids and reacting starch with said acids of phosphoric anhydride in said suspension at a pH of over 8 and at a temperature lower than the gelatinization temperature of the starch.

4. The process of claim 3 wherein an alkaline buffering agent is added to the aqueous medium to maintain a pH of over 8.

5. The process of claim 4 wherein said buffering agent is an alkali metal carbonate.

6. The process of claim 3 wherein aqueous starch suspension is adjusted to a pH of from 8 to 12.

References Cited

UNITED STATES PATENTS 2,884,413   4/1959   Kerr et al. _____ 260—233.5
2,801,242   7/1957   Kerr et al. _____ 260—233.5

OTHER REFERENCES

Van Wazer, Phosphorus and Its Compounds, vol. I, pp. 485 and 486 (1958).

Van Wazer, Phosphorus and Its Compounds, vol. II, pp. 1214 and 1215 (1961).

Whistler et al., Starch, Chemistry and Technology, vol. I, (1965).

DONALD E. CZAJA, Primary Examiner

M. I. MARQUIS, Assistant Examiner

U.S. Cl. X.R.

99—139; 260—233.3